US008345879B2

(12) United States Patent
Singh (10) Patent No.: US 8,345,879 B2
(45) Date of Patent: *Jan. 1, 2013

(54) SECURING WIRELESS BODY SENSOR NETWORKS USING PHYSIOLOGICAL DATA

(75) Inventor: Kalvinder Pal Singh, Gold Coast City (AU)

(73) Assignee: International Business Machines Corporation, Armonk, NY (US)

( * ) Notice: Subject to any disclaimer, the term of this patent is extended or adjusted under 35 U.S.C. 154(b) by 1044 days.

This patent is subject to a terminal disclaimer.

(21) Appl. No.: 12/109,950

(22) Filed: Apr. 25, 2008

(65) Prior Publication Data

US 2009/0268914 A1    Oct. 29, 2009

(51) Int. Cl.
*G06F 21/00* (2006.01)
(52) U.S. Cl. ........................................................ 380/279
(58) Field of Classification Search .......... 713/168–169; 726/2; 380/279
See application file for complete search history.

(56) References Cited

U.S. PATENT DOCUMENTS

| 7,206,649 | B2* | 4/2007 | Kirovski et al. | 700/94 |
| 2002/0136410 | A1* | 9/2002 | Hanna | 380/277 |
| 2004/0049676 | A1* | 3/2004 | Dutertre et al. | 713/163 |
| 2007/0036355 | A1 | 2/2007 | Terauchi et al. | |
| 2007/0071237 | A1* | 3/2007 | Brown et al. | 380/30 |
| 2008/0209545 | A1* | 8/2008 | Asano | 726/19 |

OTHER PUBLICATIONS

Malasri et al., "Addressing Security in Medical Sensor Networks", HealthNet'07, Jun. 2007, San Juan, Puerto Rico, ACM, 2007, pp. 1-6.
Venkatasubramanian, "Secure Cluster Formation in BSN Using Physiological Values", 2007, pp. 1-19 http://impact.asu.edu/~mcn/cse591sp07/Final_presentations/Krishna_Final_Presentation.ppt.
Shudi et al., "Authenticated Symmetric-Key Establishment for Medical Body Sensor Networks", Journal of Electronics (China), vol. 24, No. 3, May 2007, pp. 421-427.
Asokan, "Initializing Security Associations for Personal Devices", Nokia Research Center, ZISC Workshop on Wireless Security, Sep. 2007, Helsinki Finland pp. 1-89 http://asokan.org/asokan/research/zisc-tut.pdf.

* cited by examiner

*Primary Examiner* — Brandon Hoffman
*Assistant Examiner* — Anthony Brown
(74) *Attorney, Agent, or Firm* — Yee & Associates, P.C.; John D. Flynn (57) ABSTRACT

A computer implemented method, apparatus, and computer program product for securing wireless body sensor networks with a three party password protocol. The password protocol combines the Bellare-Rogaway 3PKDP (three-party key distribution protocol) and the Diffie-Hellman password protocol. The three party password protocol also uses physiological values in place of passwords in one of the key exchanges. The other key exchanges in the protocol use symmetric key cryptography. The combination of the Bellare-Rogaway three-party key distribution protocol and the Diffie-Hellman password protocol allows two sensors which do not measure the same environmental data to authenticate and establish keys.

61 Claims, 5 Drawing Sheets

502 — $m_{AS} = [[t_{AS}]]_{SEV_1}$   504 — $m'_{AS} = [[t_{SA}]]_{SEV_2}$
506 — $m_{BS} = [[t_{BS}]]_{SEV_3}$   508 — $m'_{BS} = [[t_{SB}]]_{SEV_4}$
510 — M1 A → B: $A, m_{AS}$
512 — M2 B → S: $A, B, m_{AS}, m_{BS}$
514 — M3 S → A: $m'_{AS}, K_{AS} \oplus K_{AB}, [A, B, K_{AS} \oplus K_{AB}]_{K_{AS}}$
516 — M4 S → B: $m'_{BS}, K_{BS} \oplus K_{AB}, [A, B, K_{BS} \oplus K_{AB}]_{K_{BS}}$

*FIG. 5*

602 — $m_{AS} = [[t_{AS}]]_{SEV_1}$     604 — $m'_{AS} = [[t_{SA}]]_{SEV_2}$
606 — $K_{AS} = t_{AS}^{r_A} = t_{SA}^{r_A}$     608 — $M = A, B, K_S$
610 — $AUTH_A = [M]_{K_{AS}}$           612 — $MASK_A = [[AUTH_A]]_{K_{AS}}$
614 — $AUTH_B = [M]_{SEV_{BS}}$         616 — $MASK_B = [[AUTH_B]]_{SEV_{BS}}$

618 — M1 A → S: $A, B, N_A, m_{AS}$
620 — M2 S → B: $A, N_A, AUTH_B, MASK_B \oplus K_S, AUTH_A, MASK_A \oplus K_S, m'_{AS}$
622 — M3 B → A: $[N_A]_{K_{AB}}, N_B, AUTH_A, MASK_A \oplus K_S, m'_{AS}$
624 — M4 A → B: $[N_B]_{K_{AS}}$

SECURING WIRELESS BODY SENSOR NETWORKS USING PHYSIOLOGICAL DATA

BACKGROUND OF THE INVENTION

1. Field of the Invention

The present invention relates generally to computer and communications networks, and more specifically to securing wireless body sensor networks using physiological data.

2. Description of the Related Art

Sensor networks comprise a category of computer networks, characterized by the development of small, low cost sensor devices with combined sensing and communication (often wireless) capabilities. Most applications of sensor networks rely on combining information from multiple sensor devices to establish or infer some composite state or event of the sensed environment (often called the "sensing field"). The sensor devices are typically spread across a geographic area and contain some level of intelligence for signal processing and networking of the data. A sensor device may detect and monitor the value of some parameter at a given location, such as, for example, temperature, atmospheric pressure, relative humidity, etc.

One type of sensor network is a body sensor network. Body sensor networks typically comprise sensor devices, or sensor nodes, that are worn on or implanted within the body for measuring physiological data (vital signs, motion), combined with wireless components that wireless transmit the measured data to an external receiver, thus allowing continuous monitoring of patients in an unobtrusive manner in any environment. Each sensor node in a network may measure one or more types of a user's physiological data.

Devices within a body sensor network must be able to communicate with one another in a secure manner to ensure a user's privacy. To facilitate secure communication, data transfers between devices in the network are encrypted using either software or hardware techniques, such as key establishment protocols. However, wearable sensor nodes introduce a new set of technical problems due to resource limitations of the sensors. In a wireless body sensor network, sensors typically comprise small memories, weak processors, limited energy, and small packet size. In addition, sensors placed on or implanted within the body have no user interface, and may exist for long periods of time. The limitations of the sensors require that sensor networks be designed with extreme power conservation. As sensor nodes have little computational power, cryptographic ciphers must be used with care.

BRIEF SUMMARY OF THE INVENTION

Embodiments of the present invention relate to securing wireless body sensor networks with a three party password protocol. A first message comprising a location of a first sensor and a first ephemeral value encrypted using a first environmental value measured at the first sensor is sent from the first sensor to a second sensor in the sensor network. The second sensor sends a second message to a trusted third party comprising the location of the first sensor, a location of the second sensor, the first ephemeral value encrypted using the first environmental value measured at the first sensor, and a second ephemeral value encrypted using a second environmental value measured at the second sensor. The trusted third party sends a third message to the first sensor comprising a third ephemeral value encrypted using a third environmental value measured at the trusted third party and a session key shared between the first sensor and the second sensor and encrypted using a first ephemeral key. The trusted third party also sends a fourth message to the second sensor comprising a fourth ephemeral value encrypted using a fourth environmental value measure at the trusted third party and the session key encrypted using a second ephemeral key. The first environmental value, second environmental value, third environmental value, and fourth environmental value measured by the first sensor, second sensor, and trusted third party comprise different environmental values.

BRIEF DESCRIPTION OF THE SEVERAL VIEWS OF THE DRAWINGS

FIG. 4 illustrates the Bellare-Rogaway 3PKDP protocol;

FIG. 5 illustrates an exemplary three party password protocol comprising the Bellare-Rogaway 3PKDP protocol and the Diffie-Hellman protocol in accordance with the illustrative embodiments;

FIG. 6 exemplary three party password protocol comprising the Boyd four-pass protocol and the Diffie-Hellman protocol in accordance with the illustrative embodiments;

DETAILED DESCRIPTION OF THE INVENTION

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments of the present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Secure communication in a sensor network may be implemented using key establishment protocols. A protocol is a multi-party algorithm, defined by a sequence of steps specifying the actions required of two or more parties in order to achieve a specified objective. A key establishment protocol is a protocol whereby a shared secret becomes available to two or more parties, for subsequent cryptographic applications. Cryptography is the scrambling of information such that the information can only be unscrambled by an entity that holds the appropriate unscrambling key. By exchanging messages which can only be decrypted by those with access to the proper key, cryptographic protocols can be used as a means to authenticate entities. Asymmetric cryptography is often unsuitable for most sensor networks due to higher computational overhead, and energy and memory consumption. When using symmetric key cryptography to establish communication between two sensor devices in a sensor network, the key establishment protocols in wireless sensor networks may be sorted into main categories: pair-wise schemes, random key pre-distribution schemes, and Key Distribution Center (KDC). Key establishment protocols are used to set up shared secrets between sensor nodes. A pair-wise scheme is a protocol in which each node in a network shares a unique pairwise key with every other node in the network. A random key pre-distribution scheme relies on a random graph which is connected with high probability if the average degree of the network nodes is above a threshold. A Key Distribution Center (KDC) is a protocol where when two entities sharing no previous secret want to communicate securely with each other, they do so with the assistance of a trusted third party, which has an existing shared key between both entities.

A new fourth category for providing secure communication between sensors comprises key establishment protocols which use environmental values to establish symmetric keys. An environmental value comprises a data value measured by sensors placed in a particular environment. In one embodiment, an environmental value may comprise physiological data. For example, the environmental values may include physiological data measured from a human body environment. These environmental values may also include measurements taken from other animate objects (e.g., animals, etc.), as well as inanimate objects or other environments. Physiological values of individuals which have been measured using sensors in a body sensor network may include inter-pulse interval (IPI) and heart rate variance (HRV). A physiological value measured for an individual can provide a cryptographically random number used to encrypt a new symmetric key between a sensor pair.

For example, to initiate a key establishment protocol between a pair of sensor nodes, the first sensor in the pair generates a new session key and a nonce. The new key is used as the shared secret between the sensor pair. A nonce may be a randomly generated value or a counter value used by the receiving sensor node to confirm that the data is fresh and is not a "replay" of earlier data. A replay attack is a form of network attack in which a valid data transmission is maliciously or fraudulently repeated or delayed. The replay adversary may intercept and retransmit data, masquerading as one of the nodes to trick the receiver into unauthorized operations such as false identification or authentication or a duplicate transaction. To prevent replay attacks, nonces are sent in messages from the first sensor to initiate a key establishment protocol. An exemplary key establishment protocol for sending, from node A to neighboring sensor node B, a single message comprising a new key is shown below:

$$A \rightarrow B: N_A, [N_A]R_{ANDKEY}, RANDKEY \oplus SEV$$

where A and B are the two nodes who wish to share a new session key (RANDKEY), $N_A$ is a nonce generated by node A, and $X \oplus Y$ is an exclusive-or operation comprising a concatenation of data strings X and Y. SEV is a secure environmental value which comprises physiological data measured by a sensor in the network.

The first sensor (node A) encrypts its generated nonce using the new key, RANDKEY. As nonce $N_A$ was randomly generated by the first sensor node, playback attacks may be defeated because the replayer cannot know in advance the nonce the first sensor will generate. The new key is then encrypted with the sensor-measured physiological value, or secure environmental value (SEV), which is measured by and known only to each of the sensors placed on a particular person. Upon receiving the message, the receiving sensor (node B) may decrypt the new key using the secure environmental value and validate that the new key is correct by verifying the message authentication code (MAC) of the nonce.

A problem with existing key establishment protocols that employ physiological values in this manner is that the existing protocols require all of the sensor nodes in a network be able to measure the same phenomenon in order to provide secure communication. Using the heart rate variance (HRV) as an example, all of the sensor nodes on the body would have to measure this heart rate variance phenomenon. Thus, a receiving sensor node would be able to measure the heart rate variance that the first sensor used to encrypt the new key. To ensure secure communications between nodes in the network, only cryptographically strong physiological values should be measured and used as SEVs. A cryptographically strong physiological value is a value from sensed data in the environment that can be obtained by the sensors and is difficult to obtain through any other means. However, developing technology (e.g., ultra wideband (UWB) and radar) may be used to remotely capture the heart rate and may cause security risks when using only SEVs such as inter-pulse interval and heart rate variance to secure the communication. Physiological values such as blood pressure or iron count are less susceptible to those remote attacks; however, these values are cryptographically weaker physiological values, thus providing limited security. Furthermore, the use of PIN code or a password is not applicable to body sensor networks, since many of the sensors do not have a user-interface. Sensors may be placed in hard to reach areas, with some of the sensors implanted within the body. Also, the sensors may harvest energy directly from the body, allowing the sensors to exist for long periods of time.

Although it is not practical to use PINs and passwords in body sensors because it can be difficult to change the passwords on the sensors, password protocols may be implemented in the sensor network environment. A password protocol is a protocol that provides mutual authentication based on a password. Password protocols are typically implemented in a sensor network using either a human-entered password on the sensor or an existing 64 bit key. Password protocols are designed so that both offline and online attacks are not feasible. A feature or by-product of most password protocols is that if the password is compromised, any keys created before the password was compromised will not be compromised.

Password protocols have the special property of allowing secrets with small entropy (low randomness) to be used for key establishment. Since passwords have low randomness, they provide cryptographically weak secrets. For instance, a four digit PIN used in a password protocol contains less than 14 bits of randomness. A typical password length of eight characters has less than 48 bit of randomness, when randomly choosing upper and lower case letters as well as the digits 0 to 9. Key sizes in sensor networks are small, normally 64 bits, to enable encryption or integrity tests to consume a minimum amount of energy. As small key sizes result low randomness, the small sizes lead to the need to update keys on a regular basis for security purposes.

In a heterogeneous sensor network, sensor nodes may not be able to measure the same environmental phenomena. While this problem may be remedied by having the same sensor attached to each sensor node, adding the same sensor to every node may be cost prohibitive. Another solution to this problem is to allow sensor nodes in the network to communicate with one another securely using appropriate key establishment protocols. In this situation, a sensor node that can sense both environmental phenomena (or is sent information about both environmental phenomena) may be used to translate the messages and provide the information to two other sensor nodes using a three party password protocol. Thus, the three party password protocol may establish keys between two sensors that measure different environmental data.

In traditional networks, when using symmetric key cryptography, if two entities sharing no previous secret want to communicate securely with each other, the entities generally do so with the assistance of a trusted third party. Typically, the trusted intermediary provides an authentication service that distributes a secure session key to the sensor nodes. However, a class of issues exists in wireless sensor networks where one or more sensor nodes act as a trusted intermediary to facilitate key establishment. An issue with using a sensor node as the trusted third party is that the trusted intermediary may not have any established keys. In addition, key sizes in sensors nodes are not large. Furthermore, the sensor network may only require authenticated messages, so the sensors may not have access to an encryption algorithm.

The illustrative embodiments provide a protocol for securing wireless body sensor networks with cryptographically weak physiological values. The password protocol is a three party password protocol, where physiological values (secure environmental values (SEVs)) are used instead of passwords. The password protocol combines the Bellare-Rogaway 3PKDP (three-party key distribution protocol) and the Diffie-Hellman password protocol to create a new three party password protocol. Combining the Bellare-Rogaway three-party key distribution protocol and the Diffie-Hellman password protocol allows two sensors which do not measure the same environmental data to establish a key. Thus, the sensors may use the new three party password protocol to achieve key establishment. In the new three party password protocol, the physiological values are used in the place of passwords, and the protocol authenticates and establishes keys between sensors that do not measure the same environmental data.

The illustrative embodiments also provide a protocol for securing wireless body sensor networks with measured physiological values of differing degrees in cryptographic strength. In the heterogeneous sensor network, some sensor nodes may be able to sense values of varying cryptographic strengths. A password protocol is provided in which one sensor node may sense a cryptographically strong secure environmental value and the other sensor may sense a weak secure environmental value. The three party password protocol comprises a combination of the Boyd four-pass protocol and the Diffie-Hellman protocol. The three party password protocol uses physiological values in place of passwords in one of the key exchanges. The other key exchanges in the protocol use symmetric key cryptography.

Figure 1:
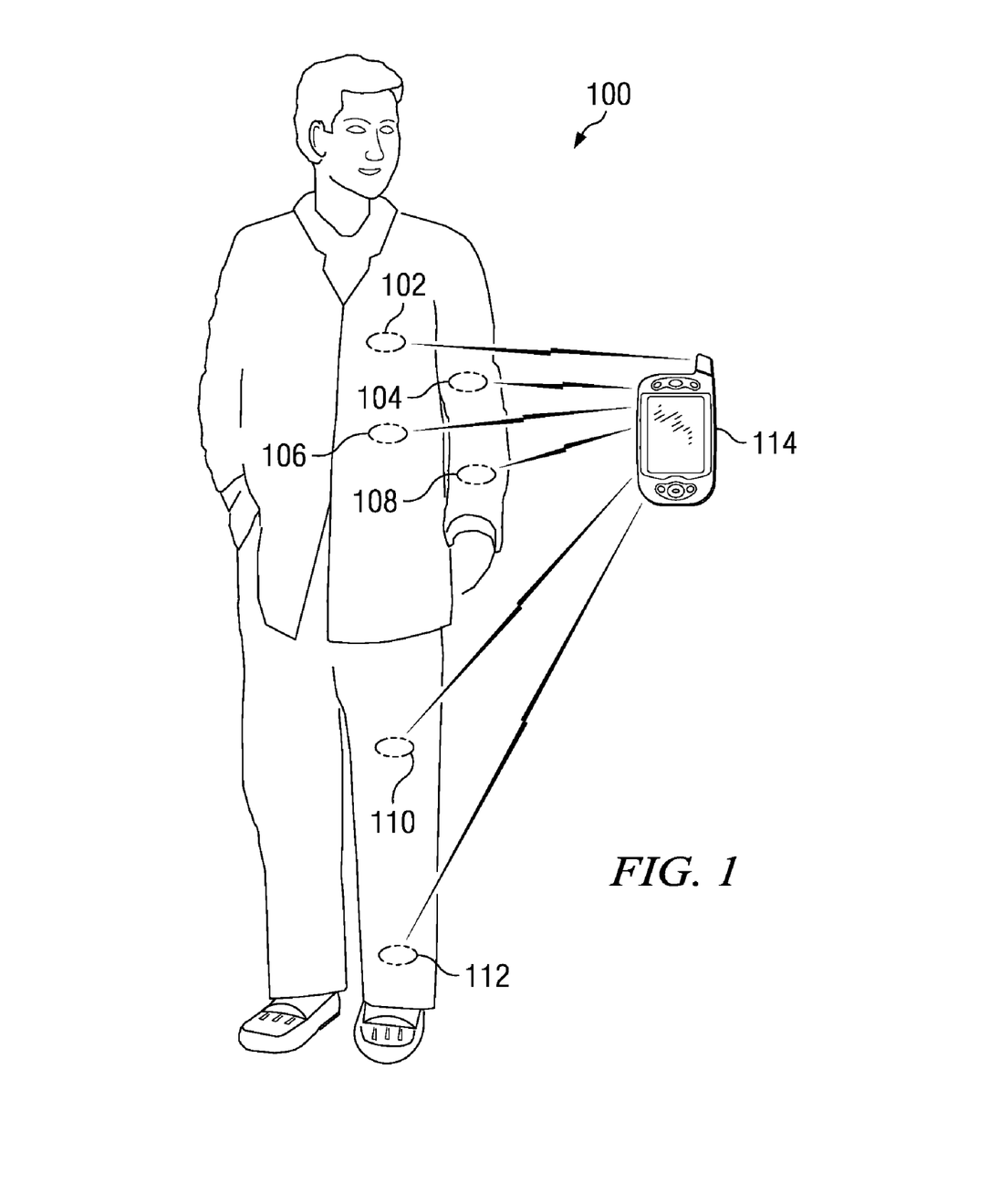
FIG. 1 is a pictorial representation of an exemplary wireless body sensor network in which the illustrative embodiments may be implemented.

Turning now to FIG. 1, a pictorial representation of an exemplary wireless body sensor network in which the illustrative embodiments may be implemented is shown. In this illustrative example, wireless body sensor network 100 includes a plurality of body-worn sensor nodes 102-112 and personal server 114. Depending upon the particular implementation, sensor nodes 102-112 may comprise patches or devices worn on the user's skin or incorporated in the user's shoes or clothing. Sensor nodes 102-112 may also comprise implanted devices within the user's body.

Sensor nodes 102-112 monitor environmental data about the user. In particular, each sensor node is capable of collecting, processing, and communicating physiological data about the user to personal server 114, and may be in use for extended periods of time. This physiological data may include, but is not limited to, inter-pulse interval (IPI) and heart rate variance (HRV). Each sensor node may be configured to measure one or more types of physiological data. Two or more of sensor nodes 102-112 may also be configured to measure the same type of physiological data. Each sensor node may transmit messages wirelessly to other sensor nodes through body sensor network 100.

Personal server 114 comprises a data processing system external to the user's body which controls wireless body sensor network 100. Personal server 114 may be implemented on a personal computer, laptop, personal digital assistant (PDA), cell phone, etc. Personal server 114 receives collected physiological data from sensor nodes 102-112 on the user through wireless body sensor network 100. Upon collecting the physiological data, personal server 114 may process the data and send this user information wirelessly through the Internet or a mobile telephone network to a medical information or hospital system (not shown).

When using symmetric key cryptography, if two entities sharing no previous secret want to communicate securely with each other, they generally do so with the assistance of a third party. In wireless sensor networks, the two entities are typically resource-constrained sensor nodes, such as sensor nodes 102-112, and the third party is a resource-heavy base station, such as personal server 114. Typically, the base station provides an authentication service that distributes a secure session key to the sensor nodes. The base station is sometimes referred to as a trusted third party, since every client has to trust it by sharing a secret with it. Many applications using wireless sensor networks do not require encryption, but do require authenticated messages. However, key establishment protocols require encryption to safely transport a new session key between the nodes. A trusted third party may comprise any software and/or hardware component that measures the same environmental values as the two sensor nodes that want to communicate securely and translates protocol messages between these two sensor nodes. In one embodiment, the trusted third party is another sensor node in the sensor network, such as sensor nodes 102-112. In another embodiment, the trusted third party is a base station device, such as personal server 114.

Figure 2:
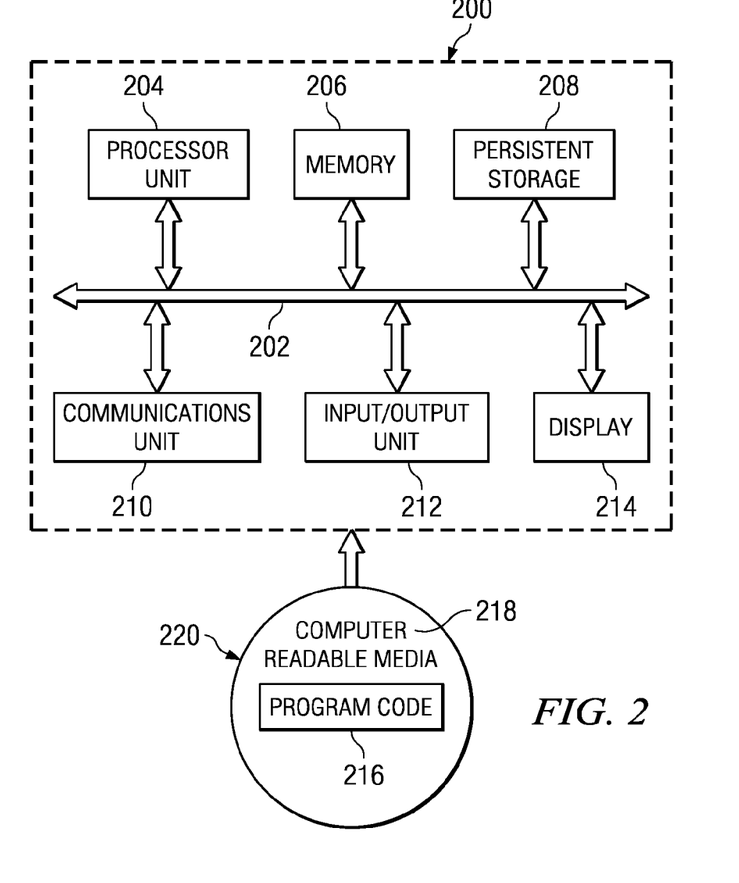
FIG. 2 is a block diagram of a data processing system with which the illustrative embodiments may be implemented.

FIG. 2 is a diagram of a data processing system in accordance with an illustrative embodiment of the present invention. Data processing system 200 is an example of personal server 114 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
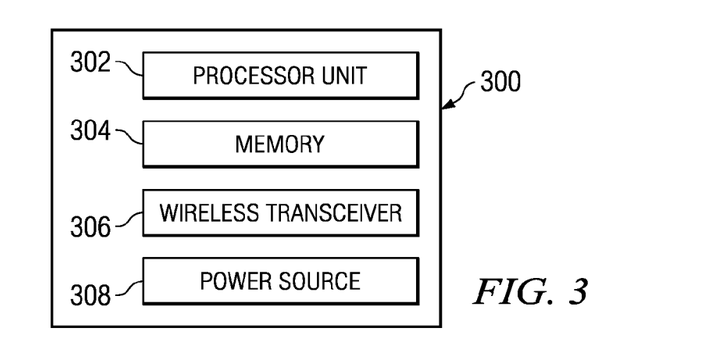
FIG. 3 is a block diagram of an exemplary sensor device with which the illustrative embodiments may be implemented.

FIG. 3 is a block diagram of an exemplary sensor device with which the illustrative embodiments may be implemented. Sensor device 300 is an example of sensor devices 102-114 in FIG. 1. In this illustrative example, sensor device 300 includes processor unit 302, memory 304, wireless transceiver 306, and power source 308. The components illustrated for sensor device 300 are not meant to provide architectural limitations to the manner in which different embodiments may be implemented. Other components shown in FIG. 3 can be varied from the illustrative examples shown.

Processor unit 302 executes instructions for software that may be loaded into memory 304. Memory 304, in these examples, may be, for example, a random access memory or any other suitable volatile or non-volatile storage device. Processor unit 302 may also receive wireless transmissions from other sensor devices in the body sensor network or from an external device such as personal server 114 in FIG. 1. These wireless transmissions may include instructions for monitoring and collecting physiological data, the physiological data collected by the sensor, and messages to initiate key establishment protocols for secure communication between the devices.

Wireless transceiver 306 provides for communications with other data processing systems or sensor nodes. Wireless transceiver 306 may provide communications through the use of wireless technology such as, for example, a Bluetooth™ connection. Power source 308 provides an energy source for operation of sensor device 300. In these examples, power source 308 may comprise a battery.

FIG. 4 illustrates the Bellare-Rogaway 3PKDP protocol. The Bellare-Rogaway 3PKDP protocol is a key distribution center (KDC) protocol comprising four messages. In the protocol, the message translation server generates the new key, both sensor nodes are guaranteed key freshness, and both sensor nodes are authenticated. The Diffie-Hellman key establishment protocol is a fundamental algebraic protocol presented in W. Diffie and M. E. Hellman, "New Directions in Cryptography," IEEE Transaction on Information Theory vol. IT 22 (November 1976), pp. 644-654. The Diffie-Hellman protocol provides a solution to the key distribution problem, allowing two parties, never having met in advance or sharing keying material, to establish a shared secret by exchanging messages over an open channel.

As shown, Bellare-Rogaway protocol 400 contains four messages. In message M1 402, sensor node A sends the values A and $N_A$ to sensor node B. A is the source address of sensor node A. The source address is sent in message M1 402 since the small operating system (OS) of the sensor does not send the source address in its packet headers. $N_A$ is a nonce value generated by sensor node A. Nonce $N_A$ may be either be a counter value or randomly generated number.

When sensor node B receives message M1 402 from sensor node A, sensor node B sends message M2 404 to a third party, or sensor node S. Message M2 404 comprises the content of message M1 402 (values A and $N_A$), in addition to address of sensor node B and a nonce $N_B$ generated by sensor node B.

Upon receiving message M2 404 from sensor node B, sensor node S then sends message M3 406 to sensor node A. Message M3 406 comprises session key $K_{AB}$ encrypted with shared key $K_{AS}$. Session key $K_{AB}$ is a key comprising a random number generated by sensor node S. Sensor node S also sends message M4 408 to sensor node B. Message M4 408 comprises session key $K_{AB}$ encrypted with shared key $K_{BS}$.

A block cipher may be used for the encryption algorithm in Bellare-Rogaway protocol 400. A block cipher is a cipher which uses a single user-provided secret key to transform a block of text with a specific length. When a block cipher is used to encrypt the session key $K_{AB}$, if the key $K_{AB}$ becomes compromised, the keys $K_{AS}$ and $K_{BS}$ will not become compromised. In contrast, the encryption in Bellare-Rogaway protocol 400 should not comprise a simple exclusive-or (XOR) function. If the key $K_{AB}$ becomes compromised, then the keys $K_{AS}$ and $K_{BS}$ can also be compromised. Thus, if Bellare-Rogaway protocol 400 is rerun, any session keys between the sensor nodes A and B will become compromised.

FIG. 5 illustrates an exemplary three party password protocol comprising the Bellare-Rogaway 3PKDP protocol and the Diffie-Hellman protocol in accordance with the illustrative embodiments. The three party password protocol uses cryptographically strong physiological values such as inter-pulse interval (IPI), heart rate variance (HRV), and other physiological values as passwords in the new password protocol to authenticate and generate new keys. The physiological data used in the protocol may be measured by the sensors in the sensor network. However, physiological data used by each party in the three party password protocol is different from the physiological data used by the other parties. The number of messages, the size of the messages, and the communication structure makes the Bellare-Rogaway protocol an ideal protocol to convert into a three party password protocol. By combining the Bellare-Rogaway protocol and the Diffie-Hellman protocol into a three party password protocol, the restriction on the encryption cipher is relaxed. In other words, a one-time pad may be used, whereas in previous protocols, the key used to encrypt the data is not a one-time key. By using the random data produced by the password protocol as the key to encrypt the new session key, a simple exclusive-or function may be employed in the three party password protocol.

When defining three party password protocol 500, the exponent is defined as $r_A \in_R Z_p$, where the size of p is 160 bits. The Diffie-Hellman ephemeral value is defined as $t_A = g^{r_A}$, where g is an agreed upon number among all the sensors, and $r_A$ is a random number. Four ephemeral values are created for three party password protocol 500, each created with different random exponents of $Z_p$. An ephemeral value is a value used only for the duration of the key establishment protocol and destroyed with the corresponding private key. Value $t_{AS}$ is the ephemeral value created by sensor node A to be sent to sensor node S (indirectly by sending $t_{AS}$ to sensor node B). Value $t_{SA}$ is the ephemeral value created by sensor node S to be sent to sensor node A. Value $t_{BS}$ is the ephemeral value created by sensor node B to be sent to sensor node S. Value $t_{SB}$ is the ephemeral value created by sensor node S to be sent to sensor node B.

Ephemeral values are encrypted by using secure environmental values (SEVs), such as physiological data measured by the sensors. Thus, when defining three party password protocol 500 the following constructs are used: $m_{AS}$ 502, where $m_{AS}=[[t_{AS}]]_{SEV_1}$, $m'_{AS}$ 504, where $m'_{AS}=[[t_{SA}]]_{SEV_2}$, $m_{BS}$ 506, where $m_{BS}=[[t_{BS}]]_{SEV_3}$, and $m'_{BS}$ 508, where $m'_{BS}=[[t_{SB}]]_{SEV_4}$. $SEV_1$ is measured by sensor node A, $SEV_2$ is measured by sensor node B, and $SEV_3$ and $SEV_4$ are measured by sensor node S. The sensor nodes may be synchronized to measure the same environmental phenomenon at the same time. Since a physiological value measured by sensor may change over time, the SEVs used to encrypt each ephemeral value in the protocol may be different, depending upon what physiological data is measured by the sensors and how long it takes for the protocol to run. Thus, a measurement taken by sensor A and used for $SEV_1$ may differ from a measurement taken by sensor B and used for $SEV_2$. Consequently, a $SEV_1$ value used in a request will differ from an $SEV_2$ value in the response. For example, if sensor node A sends a message encrypted using an environmental value $SEV_1$, sensor node B may obtain the proper $SEV_1$ value to decrypt the message. Since the sensor nodes are synchronized, sensor node B may use the length of time it takes to send the message from sensor node A to sensor node B to determine how far back sensor node B needs to go in its measured SEV values to locate the proper $SEV_1$ value to decrypt sensor node A's message. Likewise, sensor node A may determine the proper $SEV_2$ value and decrypt sensor node B's message in the same manner. However, three party password protocol 500 does not require that the SEV values always be different for encryption. Thus, the values for $SEV_1$, $SEV_2$, $SEV_3$, and $SEV_4$ in the constructs may be the same.

As shown, three party password protocol 500 comprises four messages. Additional data ($m_{AS}$ 502, $m'_{AS}$ 504, $m_{BS}$ 506, and $m'_{BS}$ 508) has been added to the messages in the Bellare-Rogaway 3PKDP. This data is included so that an ephemeral key ($K_{AS}$) may be constructed between sensor nodes A and S, and another ephemeral key ($K_{BS}$) may be constructed between sensor nodes B and S. In message M1 510, sensor node A sends a message to sensor node B comprising the source address of node A and construct $m_{AS}$ containing ephemeral value $t_{AS}$ encrypted using $SEV_1$. Sensor node B responds to message M1 510 by sending message M2 512 to sensor node S. Message M2 512 comprises the address of sensor node A, the address of sensor node B, construct $m_{AS}$, and construct $m_{BS}$ containing ephemeral value $t_{BS}$ encrypted using $SEV_3$.

When sensor node S receives message M2 512, sensor node S may create the ephemeral keys $K_{AS}$ and $K_{BS}$, since message M2 512 contains both constructs $m_{AS}$ and $m_{BS}$. Sensor node S may use the ephemeral keys to encrypt $K_{AB}$ and create the message authentication code (MAC) in messages M3 514 and M4 516. When sensor node S sends message M3 514 to sensor node A, sensor node A may calculate the session key $K_{AS}$. When sensor node S sends message M4 516 to sensor node B, sensor node B may calculate the session key $K_{BS}$. Once three party password protocol 500 is completed, session keys $K_{AS}$ and $K_{BS}$ may be discarded. Consequently, if sensor node S was ever compromised, the value $K_{AB}$ will not be compromised.

Since the keys $K_{AS}$ and $K_{BS}$ are ephemeral keys, three party password protocol 500 may use the exclusive-or function as the encryption algorithm. If the key $K_{AB}$ does become compromised, since the keys $K_{AS}$ and $K_{BS}$ are only used to establish the keys between sensor nodes A and B, three party password protocol 500 will not give away any extra information outside of the protocol.

Three party password protocol 500 currently reflects the assumption that the SEV values change each time the protocol is run. If the SEV values change each time the protocol is run, three party password protocol 500 may be executed without the use of nonces. Traditionally, the defense against a replay attack (attacks in which already used authenticators are reused) is through the use of nonces. In three party password protocol 500, the defense against the replay attack is the creation of ephemeral keys $K_{AS}$ and $K_{BS}$. If an adversary replays M1 510, then sensor node S will return a different $m'_{AS}$ to sensor node A. Sensor node A will create a new ephemeral key $K_{AS}$, and a new message M3 will be returned. Thus, the adversary will gain no new information. If an adversary replays the message M2 512, then sensor node S will return a different $m'_{BS}$ to sensor node B. Sensor node B will create a new ephemeral key $K_{BS}$, again giving the adversary no new information. If an adversary replays messages M3 514 or M4 516, then sensor nodes A or B will detect the messages as invalid, since sensor nodes A and B expected new ephemeral keys. Thus, removing nonces from the protocol limits the protocol to environments where the SEV values change between protocol runs. If the SEV values do not change, then the nonces should be added back into the protocol.

FIG. 6 exemplary three party password protocol comprising the Boyd four-pass protocol and the Diffie-Hellman protocol in accordance with the illustrative embodiments. The Boyd four-pass protocol is a key distribution center (KDC) protocol which four messages. In this protocol, all sensors taking part in the protocol generate the new key, both sensor nodes are guaranteed key freshness, and both sensor nodes are authenticated. The protocol also supplies both sensor nodes with key confirmation. The Boyd four-pass protocol offers the advantages of key authentication, key freshness, and key confirmation in only four messages. Combining the Boyd four-pass protocol and the Diffie-Hellman protocol into a three party password protocol provides a protocol for authenticating and establishing keys between sensors that measure differing degrees of cryptographically strong physiological data.

Nonces are used in the Boyd protocol to guarantee that the key is fresh. However, a problem with the Boyd protocol is that the protocol is prone to replay attacks. Boyd's defense against the replay attack relies on a revocation list being available to all sensor nodes. However, having a revocation list infrastructure may not be feasible in a low band-width, low energy, and low computational environment such as a sensor network. Three party password protocol 600 is provided which combines the Boyd four-pass protocol and the Diffie-Hellman protocol in a manner to remove the security flaw in the Boyd protocol. Three party password protocol 600 uses cryptographically strong physiological values such as inter-pulse interval (IPI), heart rate variance (HRV), and other physiological values as passwords in the new password protocol to authenticate and generate new keys. Three party password protocol 600 creates new ephemeral keys $K_{AS}$ and $K_{BS}$ with each running of the protocol. The creation of the new ephemeral keys stops any replay attacks.

In defining three party password protocol 600, the exponent is defined as $r_A \in_R Z_p$, where the size of p is 160 bits, and the Diffie-Hellman ephemeral value is defined as $t_A = g^{r_A}$, where $r_A$ is a random number. Two ephemeral values are created for three party password protocol 600, each created with different random exponents of $Z_p$. Ephemeral value $t_{AS}$ is created by sensor node A to be sent to sensor node S (indirectly through sensor node B). Ephemeral value $t_{SA}$ is the ephemeral value created by sensor node S to be sent to sensor node A. The ephemeral values are used in constructs $m_{AS}$ 602, where $m_{AS}=[[t_{AS}]]_{SEV_1}$, and $m'_{AS}$ 604, where $m'_{AS}[[t_{SA}]]_{SEV_2}$.

In addition, the shared key $K_{AS}$ 606 is defined as $t_{AS}^{rs}=t_{SA}^{rA}$, and M 608 comprises the addresses of sensor nodes A and B and key $K_S$. $K_S$ is a random key created by server S. The authentication construct 610 and mask construct 612 used for sensor node A are as follows: $AUTH_A=[[M]]K_{AS}$ and $MASK_A=[[AUTH_A]]K_{AS}$. In the authentication and mask constructs, the symbols A and B identify the communicating sensor nodes. $K_{AS}$ and $K_{BS}$ are a long term session keys initially shared by sensor A and server S for centralized authentication. Similar constructs 614 and 616 are created for sensor node B. The authentication constructs are used to authenticate and identify the other sensor. The masks may either be created from an encryption algorithm or from a message authentication code (MAC). An encryption algorithm may be used in situations where it is more efficient to do so. For example, it may be more efficient to use encryption than to use cipher block chaining message authentication code (CBC-MAC), where the algorithm uses an underlying encryption algorithm. In situations where no encryption algorithm available (e.g., only HMAC-MD5 or hardware support), however, then the MASK may be created using the MAC. The size of the MASK should be equal to or greater than the size of the keys. TinySEC, which is a link layer security architecture for wireless sensor networks, has a 32 bit MAC by default. However, the CBC-MAC used in TinySEC may create a variable size MAC.

Unlike the Bellare-Rogaway KDC protocol where sensor node S receives a message created by both sensor nodes A and B, sensor node S only receives data from sensor node A in three party password protocol 600. Three party password protocol 600 may be used in situations where the only weak secure environmental data is between sensor nodes A and S.

Three party password protocol 600 contains four messages based on the Boyd three party protocol. Additional data ($m_{AS}$ 602 and $m'_{AS}$ 604) has been added to each message, so that an ephemeral key may be constructed between sensor nodes A and S. The session key between sensor nodes B and S may be based on a secure environmental value (SEV), which both sensor nodes B and S may obtain or sense. In message M1 618, sensor node A sends a message to sensor node S comprising the addresses of nodes A and B, a nonce $N_A$, and construct $m_{AS}$ containing ephemeral value $t_{AS}$ encrypted using $SEV_1$. $N_A$ is a nonce value generated by sensor node A. Nonce $N_A$ may be either be a counter value or randomly generated number. Sensor node S responds to message M1 618 by sending message M2 620 to sensor node B. Message M2 620 comprises the address of sensor node A, nonce $N_A$, the authentication and mask for sensor node B, the authentication and mask for sensor node A, and construct $m'_{AS}$ containing ephemeral value $t_{SA}$ encrypted using a second environmental value, $SEV_2$.

When sensor node B receives message M2 620, sensor node B may use information generated from nodes A, B, and S to create session key $K_{AB}$. For instance, $K_{AB}$ may be generated using the information from nodes A, B and S, in the following equation: $K_{AB}=[N_A, N_B]K_S$. $N_B$ is a nonce value generated by sensor node B and may be either be a counter value or randomly generated number. Sensor node B sends message M3 622 comprising encrypted nonce $N_A$, nonce $N_B$, the authentication and mask for sensor node A, and construct $m'_{AS}$. Sensor node A is then able calculate the session key $K_{AB}$ and sends message M4 624 comprising encrypted nonce $N_B$ to sensor node B.

Key confirmation functionality may not be required in all situations. Key confirmation is only required if after the protocol is run, the sensors need to know that the other sensor definitely has the key. In this case, parts of message M3 622 (encrypted $N_A$ and $N_B$) and all of message M4 624 may be removed.

Figure 7:
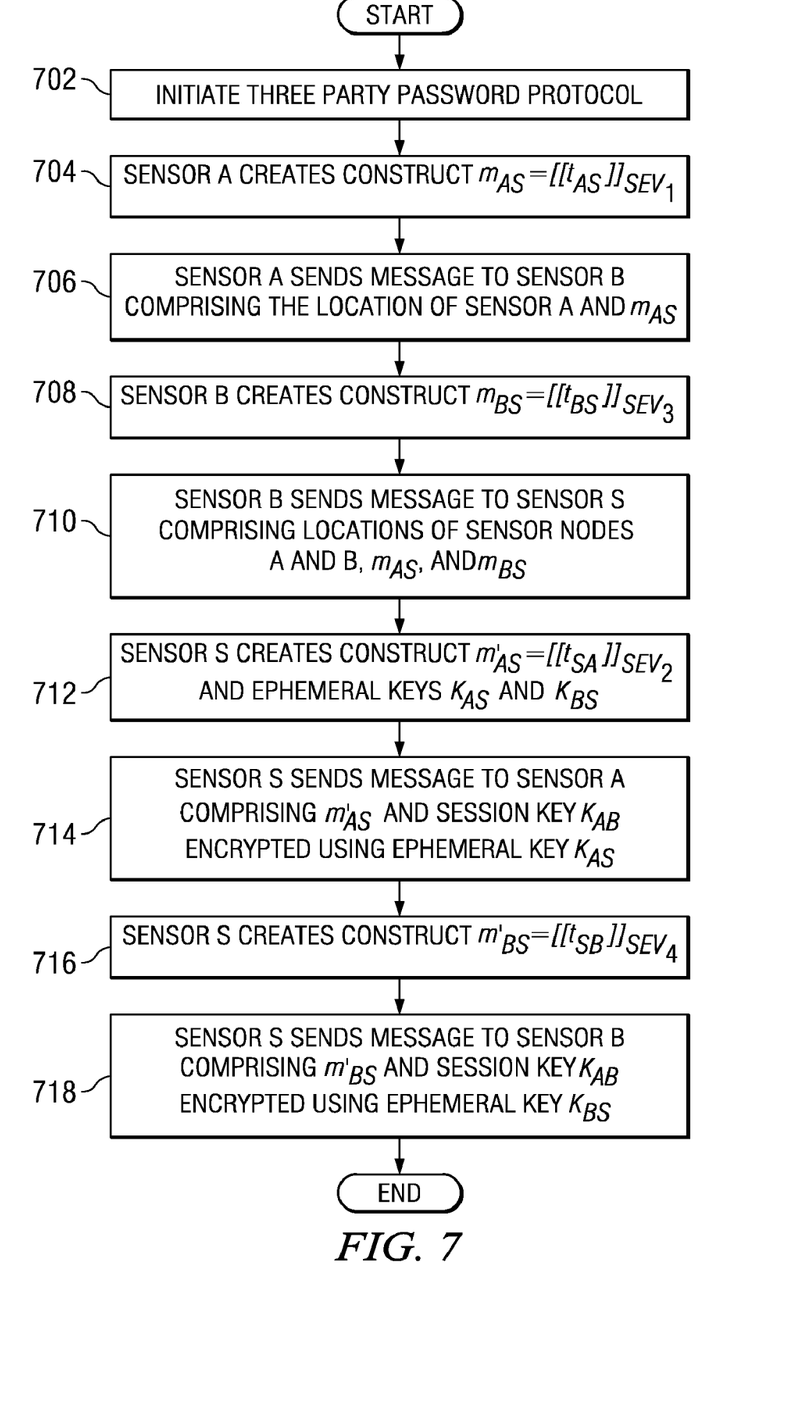
FIG. 7 is a flowchart of a process for using cryptographically weak physiological values as passwords in a three party password protocol in accordance with the illustrative embodiments.

FIG. 7 is a flowchart of a process for using cryptographically weak physiological values as passwords in a three party password protocol in accordance with the illustrative embodiments. The process described in FIG. 7 may be implemented in a sensor network such as wireless body sensor network 100 shown in FIG. 1. The three party password protocol comprises a combination of the Bellare-Rogaway 3PKDP protocol and the Diffie-Hellman protocol to authenticate and establish keys between sensors that do not measure the same physiological data.

The process begins when three sensor nodes in the body sensor network initiate execution of the three party password protocol to communicate securely with one another (step 702). Sensor node A creates construct $m_{AS}=[[t_{AS}]]_{SEV_1}$, wherein $SEV_1$ is a physiological value measured by sensor node A (step 704). Sensor node A sends a message to sensor node B comprising the location of sensor node A and $m_{AS}$ (step 706). Upon receiving the message, sensor node B creates construct $m_{BS}=[[t_{BS}]]_{SEV_3}$, wherein $SEV_3$ is a physiological value (different from $SEV_1$) measured by sensor node B (step 708). Sensor node B sends a message to third party sensor node S comprising the locations of sensor nodes A and B, $m_{AS}$, and $m_{BS}$ (step 710).

Using $m_{AS}$, and $m_{BS}$, sensor node S creates construct $m'_{AS}=[[t_{SA}]]_{SEV_2}$, wherein $SEV_2$ is a physiological value (different from $SEV_1$ or $SEV_3$) measured by sensor node S, and ephemeral keys $K_{AS}$ and $K_{BS}$ (step 712). Sensor node S sends a message to sensor node A comprising $m'_{AS}$ and session key $K_{AB}$ encrypted using ephemeral key $K_{AS}$ (step 714). Sensor node S also creates construct $m'_{BS}=[[t_{SB}]]_{SEV_4}$, wherein $SEV_4$ is a physiological value (different from $SEV_1$, $SEV_2$, or $SEV_3$) measured by sensor node S (step 716). Sensor node S sends a message to sensor node B comprising $m'_{BS}$ and session key $K_{AB}$ encrypted using ephemeral key $K_{BS}$ (step 718).

Figure 8:
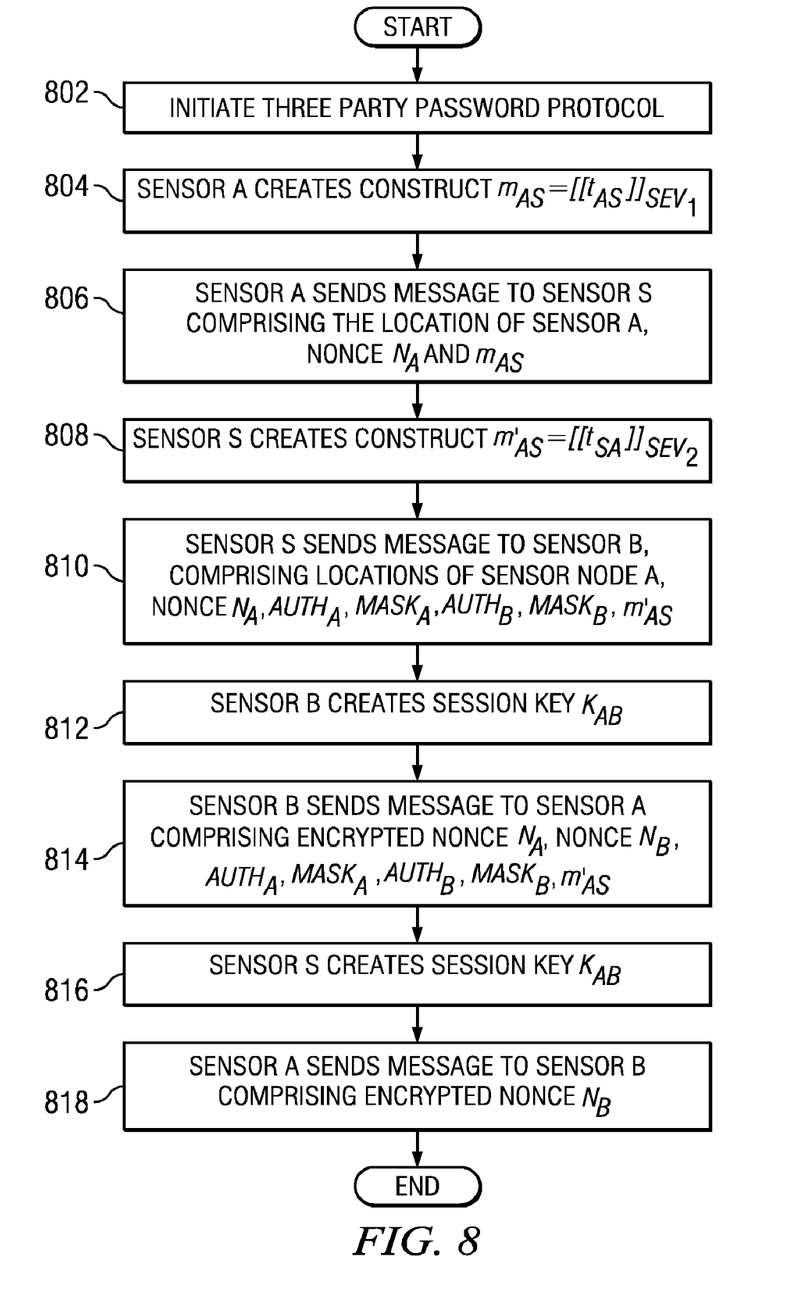
FIG. 8 is a flowchart of a process for using differing degrees of cryptographically strong physiological values as passwords in a three party password protocol in accordance with the illustrative embodiments.

FIG. 8 is a flowchart of a process for using differing degrees of cryptographically strong physiological values as passwords in a three party password protocol in accordance with the illustrative embodiments. The process described in FIG. 8 may be implemented in a sensor network such as wireless body sensor network 100. The three party password protocol comprises a combination of the Boyd four-pass protocol and the Diffie-Hellman protocol to authenticate and establish keys between sensors that measure differing degrees of cryptographically strong physiological data.

The process begins when three sensor nodes in the body sensor network initiate execution of the three party password protocol to communicate securely with one another (step 802). Sensor node A creates construct $m_{AS}=[[t_{AS}]]_{SEV_1}$, wherein $SEV_1$ is a cryptographically strong physiological value measured by sensor node A (step 804). Sensor node A sends a message to third party sensor node S comprising the location of sensor nodes A and B, a nonce $N_A$, and construct $m_{AS}$. $N_A$ is a nonce value generated by sensor node A and $m_{AS}$ (step 806). Upon receiving the message, sensor node S creates construct $m'_{AS}=[[t_{SA}]]_{SEV_2}$, wherein $SEV_2$ is a cryptographically strong physiological value (or a different degree from $SEV_1$) measured by sensor node S (step 808). Sensor node S sends a message to sensor node B comprising the locations of sensor node A, nonce $N_A$, the authentication and mask for sensor node B, the authentication and mask for sensor node A, and construct $m'_{AS}$ (step 810).

Sensor node B uses information generated from nodes A, B, and S to calculate session key $K_{AB}$ (step 812). Sensor node B sends a message to sensor node A comprising encrypted nonce $N_A$, nonce $N_B$, the authentication and mask for sensor node A, and construct $m'_{AS}$ (step 814). Sensor node A also calculates session key $K_{AB}$ (step 816). Sensor node A then sends a message comprising encrypted nonce $N_B$ to sensor node B (step 818).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for securing a sensor network with a three party password protocol, the computer implemented method comprising:
   sending, from a first sensor to a second sensor, a first message comprising a location of the first sensor and a first ephemeral value, wherein the first ephemeral value is encrypted using a first environmental value measured at the first sensor;
   sending, from the second sensor to a trusted third party, a second message comprising the location of the first sensor, a location of the second sensor, the first ephemeral value, wherein the first ephemeral value is encrypted using the first environmental value measured at the first sensor, and a second ephemeral value, wherein the second ephemeral value is encrypted using a second environmental value measured at the second sensor;
   sending, from the trusted third party to the first sensor, a third message comprising a third ephemeral value, wherein the third ephemeral value is encrypted using a third environmental value measured at the trusted third party, and a session key shared between the first sensor and the second sensor, wherein the session key is encrypted using a first ephemeral key; and sending, from the trusted third party to the second sensor, a fourth message comprising a fourth ephemeral value, wherein the fourth ephemeral value is encrypted using a fourth environmental value measured at the trusted third party, and the session key, wherein the session key is encrypted using a second ephemeral key;

wherein the first environmental value, second environmental value, third environmental value, and fourth environmental value comprise different environmental values.

2. The computer implemented method of claim 1, wherein the three party password protocol comprises a combination of a password protocol and a three party protocol.

3. The computer implemented method of claim 1, wherein the password protocol is a Diffie-Hellman password protocol, and wherein the three party protocol is a Bellare-Rogaway three party key distribution protocol.

4. The computer implemented method of claim 1, wherein the first environmental value, second environmental value, third environmental value, and fourth environmental value change each time the protocol is run.

5. The computer implemented method of claim 1, further comprising:

discarding the first ephemeral key and the second ephemeral key after the three party password protocol is completed.

6. The computer implemented method of claim 1, wherein the sensor network is a wireless body sensor network.

7. The computer implemented method of claim 1, wherein the first environmental value, second environmental value, third environmental value, and fourth environmental value comprise physiological data collected from sensors placed in proximity to or within a human body.

8. The computer implemented method of claim 7, wherein the physiological data comprises cryptographically weak values.

9. The computer implemented method of claim 7, wherein the physiological data comprises one of inter-pulse interval or heart rate variance values.

10. The computer implemented method of claim 1, wherein sending the first message further comprises:

creating the first ephemeral value using an equation $t_{AS}=g^{r_A}$, wherein g is a random number generator and $r_A$ is a random value; and encrypting the first ephemeral value with the first environmental value.

11. The computer implemented method of claim 10, wherein sending the second message further comprises:

creating the second ephemeral value using an equation $t_{BS}=g^{r_B}$, where $r_B$ is a random value; and encrypting the second ephemeral value with the second environmental value.

12. The computer implemented method of claim 11, wherein sending the third message further comprises:

creating the first ephemeral key between the first sensor and the trusted third party using the first ephemeral value using an equation $K_{AS}=t_{AS}^{r_B}$;

creating the session key comprising a random number generated by the trusted third party; and encrypting the session key with the first ephemeral key.

13. The computer implemented method of claim 12, wherein sending the fourth message further comprises:

creating the second ephemeral key between the second sensor and the trusted third party using the second ephemeral value in an equation $K_{BS}=t_{BS}^{r_B}$; and encrypting the session key with the second ephemeral key.

14. A computer implemented method for securing a sensor network with a three party password protocol, the computer implemented method comprising:

sending, from a first sensor to a trusted third party, a first message comprising a location of the first sensor, a location of a second sensor, a first nonce, and a first ephemeral value, wherein the first ephemeral value is encrypted using a first environmental value measured at the first sensor;

sending, from the trusted third party to the second sensor, a second message comprising the location of the first sensor, the first nonce, a first authentication construct, wherein the first authentication construct is encrypted using a second environmental value shared between the trusted third party and the second sensor, a first mask encrypted using the second environmental value, a second authentication construct encrypted using an ephemeral key, a second mask encrypted using the ephemeral key, and a second ephemeral value encrypted using the second environmental value, wherein the second environmental value is measured at the trusted third party;

sending, from the second sensor to the first sensor, a third message comprising the first nonce, wherein the first nonce is encrypted using a session key shared between the first sensor and the second sensor, a second nonce created by the second sensor, the second authentication construct encrypted using the ephemeral key, the second mask encrypted using the first ephemeral value, and the second ephemeral value encrypted using the second environmental value; and sending, from the first sensor to the second sensor, a fourth message comprising the second nonce, wherein the second nonce is encrypted using the ephemeral key;

wherein the first environmental value and the second environmental value comprise environmental values of different cryptographic strength.

15. The computer implemented method of claim 14, wherein the three party password protocol comprises a combination of a password protocol and a three party protocol.

16. The computer implemented method of claim 14, wherein the password protocol is a Diffie-Hellman password protocol, and wherein the three party protocol is a Boyd four-pass key distribution protocol.

17. The computer implemented method of claim 14, wherein the sensor network is a wireless body sensor network.

18. The computer implemented method of claim 14, wherein the first environmental value and the second environmental value comprise physiological data collected from sensors placed in proximity to or within a human body.

19. The computer implemented method of claim 18, wherein the physiological data comprises one of inter-pulse interval or heart rate variance values.

20. The computer implemented method of claim 18, wherein the first environmental value and the second environmental value include both cryptographically strong and cryptographically weak physiological data.

21. The computer implemented method of claim 14, wherein sending the first message further comprises:

generating the first nonce at the first sensor;

creating the first ephemeral value using an equation $t_{AS}=g^{r_A}$, wherein g is a random number generator and $r_A$ is a random value; and encrypting the first ephemeral value with the first environmental value.

22. The computer implemented method of claim 21, wherein sending the second message further comprises:

creating the first authentication construct comprising the location of the first sensor, a location of the second sensor, and a key generated by the trusted third party;

encrypting the first authentication construct using the second environmental value shared between the trusted third party and the second sensor;

creating the first mask comprising the first authentication construct;

encrypting the first mask using the second environmental value;

creating a second authentication construct comprising the location of the first sensor, a location of the second sensor, and the key generated by the trusted third party;

encrypting the second authentication construct using the ephemeral key;

creating the second mask comprising the second authentication construct;

encrypting the second mask using the ephemeral key;

creating the second ephemeral value using an equation $t_{sA}=g^{r_B}$, where $r_B$ is a random value; and encrypting the second ephemeral value with the second environmental value.

23. The computer implemented method of claim 22, wherein sending the third message further comprises:
generating the second nonce at the second sensor; and
encrypting the first nonce using the ephemeral key.

24. The computer implemented method of claim 23, wherein sending the fourth message further comprises:
encrypting the second nonce using the ephemeral key.

25. A computer implemented apparatus for securing a sensor network with a three party password protocol, the computer implemented apparatus comprising:
a first sensor which senses a first environmental value;
a second sensor which senses a second environmental value; and
a trusted third party which senses a third environmental value and a fourth environmental value;
wherein the first sensor, second sensor, and trusted third party are coupled to form the sensor network;
wherein the first environmental value, second environmental value, third environmental value, and fourth environmental value comprise different environmental values;
wherein the first sensor sends a first message to the second sensor comprising a location of the first sensor and a first ephemeral value, wherein the first ephemeral value is encrypted using a first environmental value measured at the first sensor;
wherein the second sensor sends a second message to the trusted third party comprising the location of the first sensor, a location of the second sensor, the first ephemeral value, wherein the first ephemeral value is encrypted using the first environmental value measured at the first sensor, and a second ephemeral value, wherein the second ephemeral value is encrypted using a second environmental value measured at the second sensor;
wherein the third party sends a third message to the first sensor comprising a third ephemeral value, wherein the third ephemeral value is encrypted using a third environmental value measured at the trusted third party and a session key shared between the first sensor and the second sensor, wherein the session key is encrypted using a first ephemeral key; and
wherein the trusted third party sends a fourth message to the second sensor comprising a fourth ephemeral value, wherein the fourth ephemeral value is encrypted using a fourth environmental value measured at the trusted third party, and the session key, wherein the session key is encrypted using a second ephemeral key.

26. The computer implemented apparatus of claim 25, wherein the three party password protocol comprises a combination of a password protocol and a three party protocol.

27. The computer implemented apparatus of claim 25, wherein the password protocol is a Diffie-Hellman password protocol, and wherein the three party protocol is a Bellare-Rogaway three party key distribution protocol.

28. The computer implemented apparatus of claim 25, wherein the first environmental value, second environmental value, third environmental value, and fourth environmental value change each time the protocol is run.

29. The computer implemented apparatus of claim 25, further comprising:
discarding the first ephemeral key and the second ephemeral key after the three party password protocol is completed.

30. The computer implemented apparatus of claim 25, wherein the sensor network is a wireless body sensor network.

31. The computer implemented apparatus of claim 25, wherein the first environmental value, second environmental value, third environmental value, and fourth environmental value comprise physiological data collected from the first sensor, the second sensor, and the trusted third party.

32. The computer implemented apparatus of claim 31, wherein the physiological data comprises cryptographically weak values.

33. The computer implemented apparatus of claim 31, wherein the physiological data comprises one of inter-pulse interval or heart rate variance values.

34. The computer implemented apparatus of claim 25, wherein the first sensor sends the first message by creating the first ephemeral value using an equation $t_{As}=g^{r_A}$ wherein g is a random number generator and $r_A$ is a random value, and encrypting the first ephemeral value with the first environmental value.

35. The computer implemented apparatus of claim 34, wherein the second sensor sends the second message by creating the second ephemeral value using an equation $t_{BS}=g^{r_B}$ where $r_B$ is a random value, and encrypting the second ephemeral value with the second environmental value.

36. The computer implemented apparatus of claim 35, wherein the trusted third party sends the third message by creating the first ephemeral key between the first sensor and the trusted third party using the first ephemeral value using an equation $K_{AS}=t_{AS}^{r_B}$, creating the session key comprising a random number generated by the trusted third party, and encrypting the session key with the first ephemeral key.

37. The computer implemented apparatus of claim 36, wherein the trusted third party sends the fourth message by creating the second ephemeral key between the second sensor and the trusted third party using the second ephemeral value in an equation $K_{BS}=t_{BS}^{r_B}$, and encrypting the session key with the second ephemeral key.

38. A non-transitory computer program product for securing a sensor network with a three party password protocol, the computer program product comprising:
a computer usable storage device having computer usable program code tangibly embodied thereon, the computer usable program code comprising:
computer usable program code for sending, from a first sensor to a second sensor, a first message comprising a location of the first sensor and a first ephemeral value, wherein the first ephemeral value is encrypted using a first environmental value measured at the first sensor;

computer usable program code for sending, from the second sensor to a trusted third party, a second message comprising the location of the first sensor, a location of the second sensor, the first ephemeral value, wherein the first ephemeral value is encrypted using the first environmental value measured at the first sensor, and a second ephemeral value, wherein the second ephemeral value is encrypted using a second environmental value measured at the second sensor;

computer usable program code for sending, from the trusted third party to the first sensor, a third message comprising a third ephemeral value, wherein the third ephemeral value is encrypted using a third environmental value measured at the trusted third party and a session key shared between the first sensor and the second sensor, wherein the session key is encrypted using a first ephemeral key; and computer usable program code for sending, from the trusted third party to the second sensor, a fourth message comprising a fourth ephemeral value, wherein the fourth ephemeral value is encrypted using a fourth environmental value measured at the trusted third party, and the session key, wherein the session key is encrypted using a second ephemeral key;

wherein the first environmental value, second environmental value, third environmental value, and fourth environmental value comprise different environmental values.

39. The non-transitory computer program product of claim 38, wherein the three party password protocol comprises a combination of a password protocol and a three party protocol.

40. The non-transitory computer program product of claim 38, wherein the password protocol is a Diffie-Hellman password protocol, and wherein the three party protocol is a Bellare-Rogaway three party key distribution protocol.

41. The non-transitory computer program product of claim 38, wherein the first environmental value, second environmental value, third environmental value, and fourth environmental value change each time the protocol is run.

42. The non-transitory computer program product of claim 38, further comprising:
computer usable program code for discarding the first ephemeral key and the second ephemeral key after the three party password protocol is completed.

43. The non-transitory computer program product of claim 38, wherein the sensor network is a wireless body sensor network.

44. The non-transitory computer program product of claim 38, wherein the first environmental value, second environmental value, third environmental value, and fourth environmental value comprise physiological data collected from sensors placed in proximity to or within a human body.

45. The non-transitory computer program product of claim 44, wherein the physiological data comprises cryptographically weak values.

46. The non-transitory computer program product of claim 44, wherein the physiological data comprises one of inter-pulse interval or heart rate variance values.

47. The non-transitory computer program product of claim 38, wherein the computer usable program code for sending the first message further comprises:
computer usable program code for creating the first ephemeral value using an equation $t_{AS}=g^{r_A}$, wherein g is a random number generator and $r_A$ is a random value; and
computer usable program code for encrypting the first ephemeral value with the first environmental value.

48. The non-transitory computer program product of claim 47, wherein the computer usable program code for sending the second message further comprises:
computer usable program code for creating the second ephemeral value using an equation $t_{BS}=g^{r_B}$, where $r_B$ is a random value; and
computer usable program code for encrypting the second ephemeral value with the second environmental value.

49. The non-transitory computer program product of claim 48, wherein the computer usable program code for sending the third message further comprises:
computer usable program code for creating the first ephemeral key between the first sensor and the trusted third party using the first ephemeral value using an equation $K_{AS}=t_{AS}^{r_B}$;
computer usable program code for creating the session key comprising a random number generated by the trusted third party; and
computer usable program code for encrypting the session key with the first ephemeral key.

50. The non-transitory computer program product of claim 49, wherein the computer usable program code for sending the fourth message further comprises:
computer usable program code for creating the second ephemeral key between the second sensor and the trusted third party using the second ephemeral value in an equation $K_{BS}=t_{BS}^{r_B}$; and
computer usable program code for encrypting the session key with the second ephemeral key.

51. A non-transitory computer program product for securing a sensor network with a three party password protocol, the computer program product comprising:
a computer usable storage device having computer usable program code tangibly embodied thereon, the computer usable program code comprising:
computer usable program code for sending, from a first sensor to a trusted third party, a first message comprising a location of the first sensor, a location of a second sensor, a first nonce, and a first ephemeral value, wherein the first ephemeral value is encrypted using a first environmental value measured at the first sensor;
computer usable program code for sending, from the trusted third party to the second sensor, a second message comprising the location of the first sensor, the first nonce, a first authentication construct, wherein the first authentication construct is encrypted using a second environmental value shared between the trusted third party and the second sensor, a first mask encrypted using the second environmental value, a second authentication construct encrypted using an ephemeral key, a second mask encrypted using the ephemeral key, and a second ephemeral value encrypted using the second environmental value, wherein the second environmental value is measured at the trusted third party;
computer usable program code for sending, from the second sensor to the first sensor, a third message comprising the first nonce, wherein the first nonce is encrypted using a session key shared between the first sensor and the second sensor, a second nonce created by the second sensor, the second authentication construct encrypted using the ephemeral key, the second mask encrypted using the first ephemeral value, and the second ephemeral value encrypted using the second environmental value; and
computer usable program code for sending, from the first sensor to the second sensor, a fourth message comprising the second nonce, wherein the second nonce is encrypted using the ephemeral key;
wherein the first environmental value and the second environmental value comprise environmental values of different cryptographic strength.

52. The non-transitory computer program product of claim 51, wherein the three party password protocol comprises a combination of a password protocol and a three party protocol.

53. The non-transitory computer program product of claim 51, wherein the password protocol is a Diffie-Hellman password protocol, and wherein the three party protocol is a Boyd four-pass key distribution protocol.

54. The non-transitory computer program product of claim 51, wherein the sensor network is a wireless body sensor network.

55. The non-transitory computer program product of claim 51, wherein the first environmental value and the second environmental value comprise physiological data collected from sensors placed in proximity to or within a human body.

56. The non-transitory computer program product of claim 55, wherein the physiological data comprises one of inter-pulse interval or heart rate variance values.

57. The non-transitory computer program product of claim 55, wherein the first environmental value and the second environmental value include both cryptographically strong and cryptographically weak physiological data.

58. The non-transitory computer program product of claim 51, wherein the computer usable program code for sending the first message further comprises:
    computer usable program code for generating the first nonce at the first sensor;
    computer usable program code for creating the first ephemeral value using an equation $t_{AS}=g^{r_A}$, wherein g is a random number generator and $r_A$ is a random value; and
    computer usable program code for encrypting the first ephemeral value with the first environmental value.

59. The non-transitory computer program product of claim 58, wherein the computer usable program code for sending the second message further comprises:
    computer usable program code for creating the first authentication construct comprising the location of the first sensor, a location of the second sensor, and a key generated by the trusted third party;
    computer usable program code for encrypting the first authentication construct using the second environmental value shared between the trusted third party and the second sensor;
    computer usable program code for creating the first mask comprising the first authentication construct;
    computer usable program code for encrypting the first mask using the second environmental value;
    computer usable program code for creating a second authentication construct comprising the location of the first sensor, a location of the second sensor, and the key generated by the trusted third party;
    computer usable program code for encrypting the second authentication construct using the ephemeral key;
    computer usable program code for creating the second mask comprising the second authentication construct;
    computer usable program code for encrypting the second mask using the ephemeral key;
    computer usable program code for creating the second ephemeral value using an equation $t_{SA}=g^{r_B}$, where $r_B$ is a random value; and
    computer usable program code for encrypting the second ephemeral value with the second environmental value.

60. The non-transitory computer program product of claim 59, wherein the computer usable program code for sending the third message further comprises:
    computer usable program code for generating the second nonce at the second sensor; and
    computer usable program code for encrypting the first nonce using the ephemeral key.

61. The non-transitory computer program product of claim 60, wherein the computer usable program code for sending the fourth message further comprises:
    computer usable program code for encrypting the second nonce using the ephemeral key.

* * * * *